US006171510B1

(12) United States Patent
Lee

(10) Patent No.: US 6,171,510 B1
(45) Date of Patent: Jan. 9, 2001

(54) METHOD FOR MAKING INK-JET PRINTER NOZZLES

(75) Inventor: William T. Lee, San Jose, CA (US)

(73) Assignee: Applied Materials Inc., Santa Clara, CA (US)

( * ) Notice: Under 35 U.S.C. 154(b), the term of this patent shall be extended for 0 days.

(21) Appl. No.: 08/960,769

(22) Filed: Oct. 30, 1997

(51) Int. Cl.[7] .................................................... G01D 15/20
(52) U.S. Cl. ................................ 216/27; 216/46; 216/72
(58) Field of Search ................................ 216/27, 46, 57, 216/72, 75, 78, 100

(56) References Cited

U.S. PATENT DOCUMENTS

| | | | |
|---|---|---|---|
| 4,624,137 | 11/1986 | Johnson et al. | 73/204 |
| 4,651,564 | 3/1987 | Johnson et al. | 73/204 |
| 4,696,188 | 9/1987 | Higashi | 73/204 |
| 4,825,693 | 5/1989 | Bohrer et al. | 743/204.25 |
| 4,915,718 | 4/1990 | Desai | 65/31 |
| 4,966,037 | 10/1990 | Sumner et al. | 73/204.26 |
| 5,041,190 | 8/1991 | Drake et al. | 156/647 |
| 5,057,853 | 10/1991 | Fisher | 346/140 |
| 5,103,276 * | 4/1992 | Shen et al. | 357/23.6 |
| 5,160,577 | 11/1992 | Deshpande | 156/644 |
| 5,487,483 | 1/1996 | Kubby | 216/27 |
| 5,631,731 | 5/1997 | Sogard | 356/121 |
| 5,747,839 * | 5/1998 | Hammond et al. | 257/253 |
| 5,847,454 * | 12/1998 | Shaw et al. | 257/734 |

OTHER PUBLICATIONS

Huston W. Rice, "Next–Generation Inkjet Printhead Drive Electronics", Jun. 1997 Hewlett–Packard Journal, index page, plus pp. 38–42.

K.P. Muller et al., "Trench Storage Node Technology for Gigabit DRAM Generations," IEEE IEDM 1996, pp. 19.4.1–19.4.4.

J. Stephen Aden et al., "The Third–Generation HP Thermal InkJet Printhead", Feb. 1994, Hewlett–Packard Journal, index page, plus pp. 41–45.

* cited by examiner

*Primary Examiner*—Randy Gulakowski
*Assistant Examiner*—Allan Olsen
(74) *Attorney, Agent, or Firm*—Townsend Towsend Crew

(57) ABSTRACT

A method for forming a chamber or nozzle structure in a substrate. The chamber is formed by first creating a surface feature, such as a pit or trench, on the surface of the substrate. A layer of resist is applied to the sidewall of the surface feature and the substrate is isotropically etched such that the etch works back up the inside of the resist on the surface feature sidewall to form a re-entrant angle between the surface feature sidewall and the top of the chamber wall. This results in a chamber that is wider than the opening between the sidewalls of the surface feature. An anisotropic etch step may be performed before or after the isotropic etch step or steps to control the final shape of the chamber.

33 Claims, 4 Drawing Sheets

METHOD FOR MAKING INK-JET PRINTER NOZZLES

BACKGROUND OF THE INVENTION

The present invention relates generally to a method of fabricating a chamber in a material using an isotropic etching step, and in particular to a method for forming a chamber with an aperture. The combination of the chamber and aperture may be used as a nozzle in an ink-jet print head.

Ink-jet technology is used in many applications. One of the more familiar applications of ink-jet technology is in computer-controlled printers. It is generally desirable that ink-jet printers produce high-quality documents at an acceptable rate of printing. An ink-jet pen, or print head, has an array of nozzles that print in a swath as the print head is moved relative to the paper. Print quality is at least partially determined by the number and size of the ink-jet nozzles in the print head, smaller nozzles providing superior print quality, and more nozzles providing a larger swath, resulting in greater printing speed, than fewer larger nozzles. It is desirable that the print quality does not degrade over the life of the ink-jet print head. To maintain print quality, some ink-jet printers use disposable print heads with a fixed amount of ink, designed such that the ink runs out before the nozzles degrade to an unacceptable level. Utilizing a disposable print head generates waste and increases the total cost per page of an ink-jet printer.

The nozzles are typically connected to an ink supply, or reservoir. In some instances, channels or conduits bring ink into a chamber beneath the nozzle opening, or aperture. Upon a command from the printer controller, the ink is expelled through the nozzle aperture onto a page of paper or other print media.

Various ink drivers may be used to expel the ink. For example, in some printers, an electric heating element, such as a thin-film resistor, heats the ink in the nozzle chamber to vaporize (boil) a portion of the ink, forming a bubble. The bubble causes some liquid ink within the nozzle chamber to be ejected out of the nozzle aperture. When the heating element is turned off, typically after only a few microseconds, the bubble collapses and nozzle chamber refills with ink. The collapse of the bubble can create large local pressures, up to 130 atmospheres, known as cavitation, within the chamber. The effects of the cavitation, which can include damage to the chamber and to the heating element, partially depend on the configuration of the chamber and aperture.

In other printers, a piezoelectric element is used to expel ink from the nozzle. The piezoelectric element changes dimensions in response to an applied electric field, and can create a pressure within the ink chamber to expel ink out the nozzle aperture.

The nozzle shape is important in determining the ink droplet size and velocity, the response of the ink driver, which may affect the printing speed, the durability of the ink driver, the durability of the nozzle, and other aspects of the ink-jet printer. Many different approaches have been used to fabricate ink-jet nozzles. Some approaches have used multi-step electroplating to form ink cavities and nozzles. Ink-jet nozzles have also been formed using lasers to ablate a polymer nozzle material deposited on a substrate. Other approaches rely on the anisotropic etching characteristics of single-crystal materials to form a chamber shape. For example, a {100} single crystal silicon substrate may be patterned with a masking material and etched with a solution, such as potassium hydroxide solution, to form a recess in the {100} substrate bounded by {111} side walls. The {100} substrate is then bonded to another substrate that contains the ink driver after aligning the nozzle to the ink driver.

There are at least three problems arising from the above process and similar processes. First, bonding the nozzle substrate to the ink driver substrate requires precise alignment and introduces a potential delamination problem. Second, the resultant chamber shape is limited to the anisotropic etching characteristic of the material, in the above case the {111} faces, and may not be optimum for the desired nozzle. Third, the process is restricted to single crystalline materials that exhibit anisotropic etching characteristics. These materials may not be the best choice for a nozzle material. For example, they may wear out too fast, especially when used with color inks that may contain anionic (sulfonated) dies and solvents.

Therefore, it is desirable to form nozzle apertures and nozzle chambers in a material that is compatible with color inks and other liquids. It is further desirable that the nozzle chamber is suitably shaped for use in an ink-jet print head or other jet device, and that the shape of the resulting nozzle chamber may be varied according to process controls to optimize nozzle performance.

SUMMARY OF THE INVENTION

The present invention provides a method for forming a chamber in a material. The chamber may be configured to define a nozzle structure. The chamber is formed by first creating a surface feature, such as a pit or trench, on the surface of the material. A layer of resist is applied to the sidewall of the surface feature and the material is isotropically etched such that the etch works back up the inside of the resist on the surface feature sidewall to form a chamber with a re-entrant angle between the surface feature sidewall and the top of the chamber wall. This results in a chamber that is wider than the opening between the sidewalls of the surface feature. An anisotropic etch step may be performed before or after an isotropic etch step to control the final shape of the chamber.

In one embodiment, ink-jet nozzles are fabricated in a layer of silicon oxide on a silicon wafer substrate. An etch-stop layer between the silicon oxide layer and the silicon substrate forms a planar back wall of the chamber. Removing the etch-stop layer after the chamber has been formed exposes an ink driver, such as a thin film resistive heater.

In another embodiment, conduits are formed in a material by forming a trench on the surface of the material. The sidewalls of the trench are covered with resist material and a conduit is etched in the material using an isotropic etch that etches back up the inside of the sidewall resist.

These and other embodiments of the present invention, as well as its advantages and features, are described in more detail in conjunction with the text below and the attached figures.

DESCRIPTION OF SPECIFIC EMBODIMENTS

The present invention provides a method for micromachining chambers in a material. A feature, such as a pit or trench, is formed on the surface of a material, and the sidewalls of the feature are covered with a resist material, leaving a portion of the bottom of the feature exposed. An etching step removes material from the exposed bottom of the surface feature. A re-entrant chamber can be formed by performing an isotropic etch that etches up the backside of the resist material on the sidewalls of the feature. The resist material is stripped from the sidewalls, resulting in an opening, or aperture, into the chamber. The shape of the chamber can be controlled by combining isotropic and anisotropic etch steps, and by layering materials with different etch selectivities. The chamber and opening may form a nozzle structure, and there may be pre-existing features, such as ink-jet drivers and integrated control circuitry underlying the material. These features are often exposed once the chamber is formed.

Figure 1A:
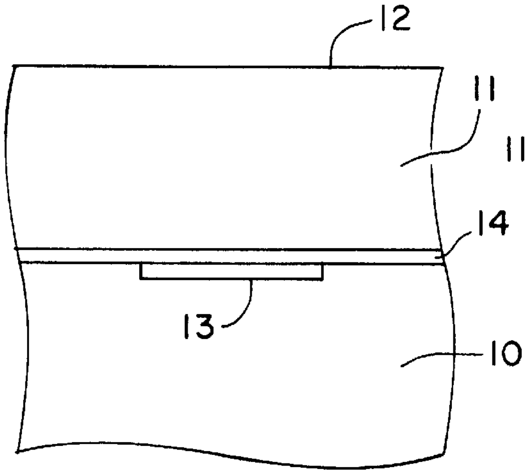
FIGS. 1A–1J are simplified cross sections of a nozzle being formed in a layer of nozzle material on a substrate according to one embodiment of the present invention.

FIGS. 1A–1J show simplified cross sections of a substrate 10 with a layer of nozzle material 11 having a top, or free, surface 12, being processed to form a nozzle structure above an ink driver 13. The figures are not drawn to scale. FIG. 1A shows an etch-stop layer 14 of titanium metal between the substrate 10 and a fifteen-micron-thick layer of silicon oxide nozzle material 11 that was deposited by a chemical vapor deposition (CVD) technique. A plasma-enhanced CVD process using tetraethylorthosilane and ozone as precursor gases is one example of a suitable technique for forming the silicon oxide layer; however, other methods and materials could be used.

For example, the nozzle material could be formed from another type of ceramic material, such as alumina, silicon nitride, or other silicate form; a metal, such as titanium; an intermetallic; or a semiconductor, such as silicon. The layer could also be formed using other techniques, such as from other precursors like silane, or by a physical vapor deposition process. Spin-on-glass (SOG) is yet another technique for forming a layer of nozzle material and forms a fairly thick layer in a short period of time (compared to some CVD processes, for example) without the need for a vacuum deposition system. The thickness of the layer is chosen according to the desired final structure, the original surface feature dimensions, and other factors. Typical layer thicknesses range between about 2 microns to about 100 microns, although thicker layers may be appropriate for some structures.

Figure 1B:
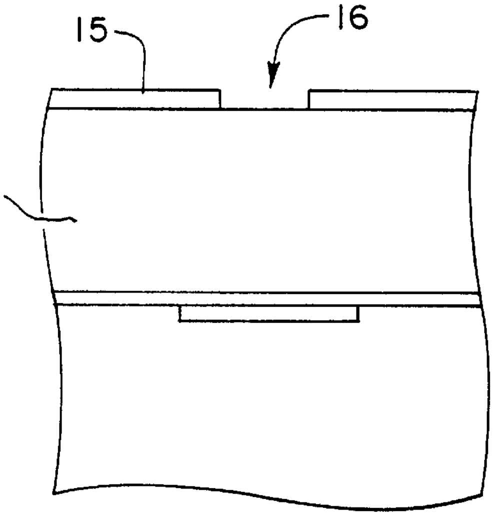

FIG. 1B shows a layer of photoresist 15 on the silicon oxide layer 11 that has been exposed and developed to form a window 16 in the photoresist.

Figure 1C:
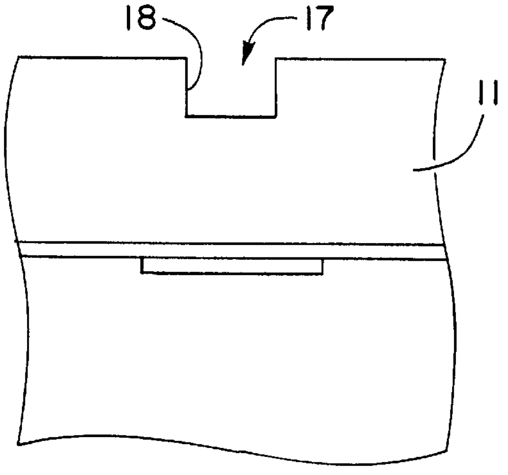

FIG. 1C shows a surface feature 17 with a sidewall 18 etched into the silicon oxide layer 11 after the photoresist has been stripped. For example, the surface feature may be a cavity with a cross section in the shape of a round cylindrical pit, an oval pit, or a rectangle, and is formed using an anisotropic biased-plasma etch.

Examples of anisotropic biased-plasma etches include capacitively coupled plasma etch systems and inductively coupled plasma etch systems, both of which may impart a kinetic, directional component to the plasma. Such an etch can be performed in an HDP™ or MxP+™ CENTURA etch system, sold by Applied Materials, Inc. of Santa Clara, Calif., using a halogenated precursor, such as carbon tetrafluoride or nitrogen trifluoride. This type of anisotropic etch does not depend on the crystallographic orientation of the material being etched, as do some other techniques, to achieve an anisotropic etch.

The size and shape of the surface feature is chosen according to the desired print head performance, among other factors. For example, a print head capable of producing 600 dots per inch with a half-inch swath may have 300 nozzles, each about 42 microns across in cross section. Even finer nozzles could be obtained, as low as 5 microns across, by appropriately selecting the surface feature dimensions, etch systems, and resist material, as discussed in further detail below.

In this example, the surface feature is a cylindrical pit nine microns in diameter and six microns deep. Much finer surface features could be formed, as the process technology and equipment is capable of forming such features with dimensions below 1 micron, and the present technique is not limited to fabricating nozzles, but could be applied to a wide variety of micro-machining operations.

Figure 1D:
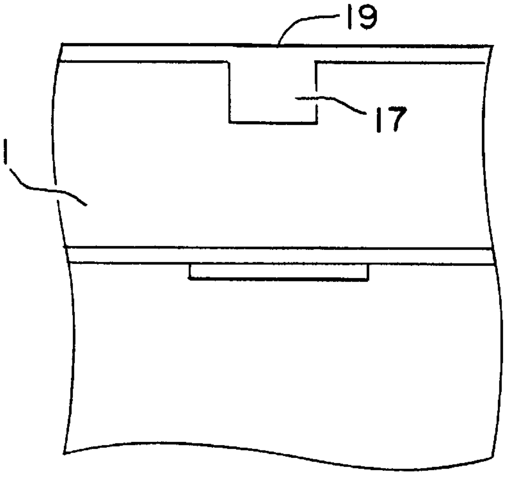
Figure 1E:
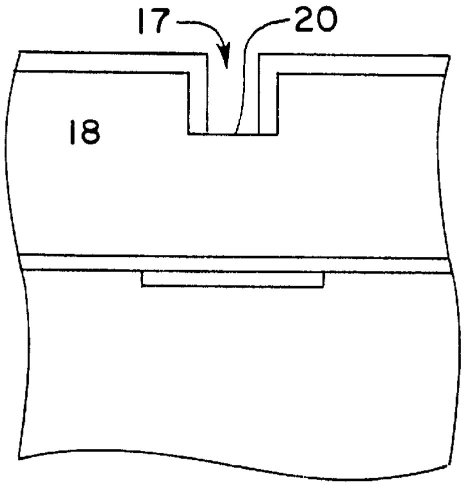

FIG. 1D shows the surface feature 17 and the silicon oxide layer 11 covered with a second resist material 19. The second resist material may be photoresist, or may be another material, such as a patterned sputtered metal layer or a spin-on layer of polymer or glass. The second resist material is chosen according to the nozzle material and etch chemistries, among other factors. Two microns of photoresist may be used to cover the field of the silicon oxide and patterned as shown in FIG. 1E. Opening a seven micron window in the photoresist leaves one micron of photoresist covering the sidewall 18 of the surface feature 17, but leaves the bottom 20 of the surface feature exposed.

Figure 1F:
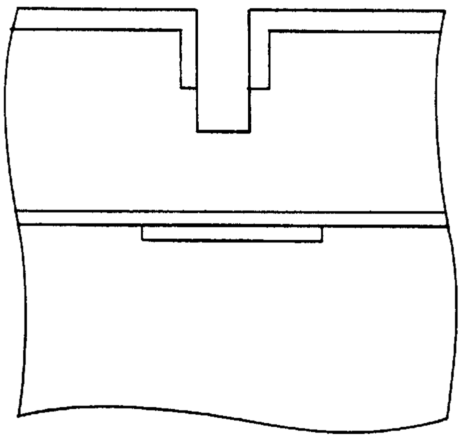

FIG. 1F shows the structure after an optional anisotropic etch step has lowered the exposed bottom of the surface feature an additional six microns. Lowering the exposed bottom of the surface feature with an anisotropic etch serves to elongate the final configuration of the chamber, providing a greater volume for a given lateral dimension than would a process that did not include this anisotropic etch step. This anisotropic etch step may also be performed with a biased plasma, as described above, and may be performed after all or a portion of the isotropic etch step has been performed. For example, an isotropic etch step following an anisotropic etch could be used to form vias that connect the chamber to underlying ink channels.

Figure 1G:
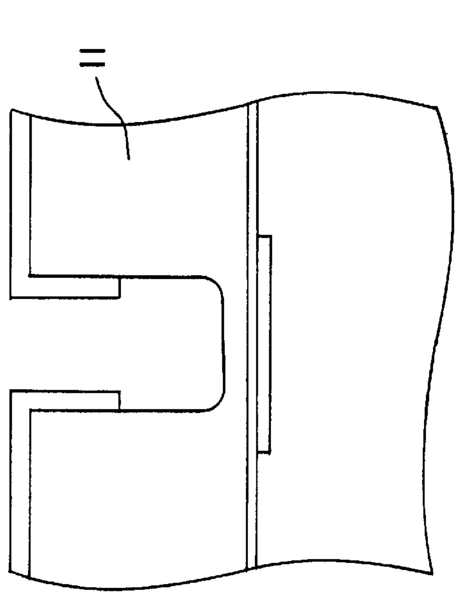
Figure 1H:
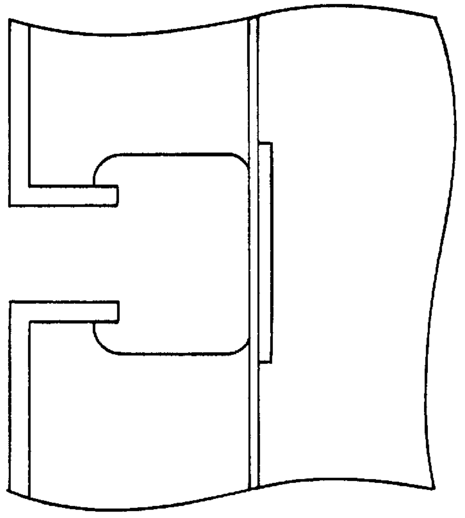

FIG. 1G shows the structure after a portion of an isotropic etch step has been performed to remove approximately one micron of nozzle material 11. The isotropic etch step is performed using a plasma generated in a remote plasma source (RPS), such as may be performed in an RPS™ chamber in conjunction with a 5000™ system or ULTIMA system, both sold by Applied Materials, Inc., of Santa Clara, Calif. As above, a halogenated precursor, such as carbon tetrafluoride or nitrogen trifluoride, may be used to generate a plasma suitable for etching the silicon oxide nozzle material. The RPS isotropic etch provides uniform etching of the nozzle material in all directions, uniform etching across the substrate, and etch repeatability from substrate-to-substrate so that a high yield of fine nozzles is obtainable. FIG. 1H shows the structure after the isotropic etch has removed approximately three microns of nozzle material 11, exposing the etch-stop layer 14.

Figure 1I:
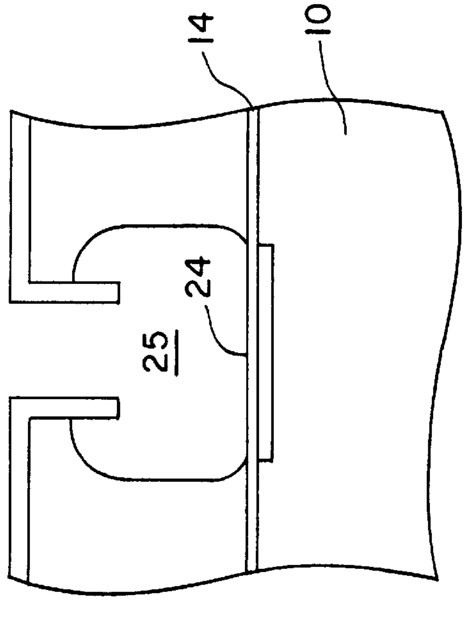
Figure 1J:
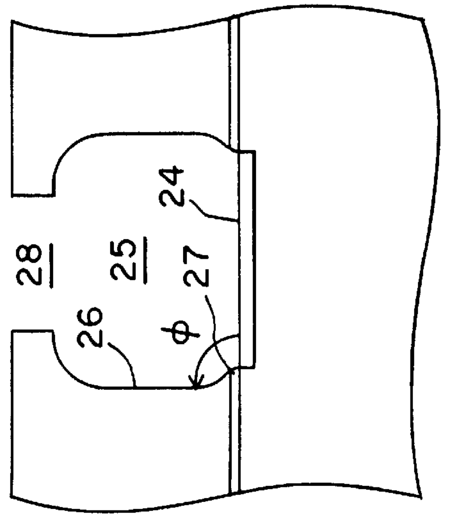

FIG. 1I shows a cross section of the structure after performing an overetch to remove an additional two microns of nozzle material from the exposed surfaces. The etch-stop layer 14 prevents the etch from proceeding into the substrate 10, which may etch at about one third the rate of the nozzle material in a fluorinated RPS-generated plasma. In comparison, the titanium metal etch-stop layer may etch at only about one twentieth the rate of the nozzle material, resulting in a planar back wall 24 of the chamber 25. After the etching process is completed, the resist material and the exposed etch-stop material is removed, resulting in the structure shown in FIG. 1J. The chamber sidewall 26 forms an oblique angle, ø, 27 with the chamber backwall 24. It is believed that an oblique "bowl shape" at the juncture of the chamber backwall and sidewall is superior to an acute juncture in order for the expanding gases generated by the ink driver to push the ink ahead of it, rather than leaving some of the ink behind at the acute corners. The aperture 28 of the nozzle has the dimensions of the original surface feature, but could be further processed to modify its size or shape, as by sputter etching the aperture to provide a countersunk facet on the upper corner of the aperture.

If a photoresist was used as the resist material, it may be ashed according to conventional processes, such as in an oxygen plasma. If a titanium metal film was used as an etch-stop layer, it may be removed with a conventional wet etch process.

Although an isotropic plasma etch was used, it is understood that a wet chemical etch, such as a buffered hydrofluoric acid etch, may be substituted for all or part of the isotropic etch step. For example, an RPS plasma etch, which may etch both silicon and silicon dioxide at a significant rate, may be used to etch the nozzle layer to within less than a micron of a silicon substrate. A wet etch that is highly selective between silicon and silicon oxide may then be used to expose the silicon substrate and to overetch the chamber. An etch-stop layer would not be necessary with this process because the wet etch would not significantly etch the silicon substrate. The choice of etchants and resists depends, in part, upon the materials used to fabricate the structure, the shapes desired, and the geometries of the features.

A resist material, or a protective layer material, is a material that does not etch as fast as the material the resist protects in a given etch system. While the above simplified drawings and descriptions treat the resist as being unaffected by the etchant, in practice some resist typically erodes during the etch process. This resist erosion must be taken into account when determining the final dimensions of a chamber or nozzle, and when choosing etch and resist systems.

Resist erosion may be expressed in terms of etch selectivity. Etch selectivity is the ratio of the etch rate of the nozzle material (silicon oxide), for example, to the etch rate of resist material (e.g., photoresist) protecting portions of the nozzle material. If the nozzle material etches five times faster than the resist material, than the etchant is said to have a selectivity of five. In other words, during the time the nozzle material is etched a distance of five microns, one micron of the resist will also be etched away. Resist erosion may limit the amount of nozzle material removed during the isotropic etch step because the resist may completely erode before the desired amount of nozzle material has been removed.

Resist erosion may be controlled by choosing a resist material with a very high etch selectivity ratio for a given etch process. For example, instead of using photoresist to line the sidewall of the surface feature, a metal layer, such as a titanium layer, could be used instead of the photoresist. The metal layer could be patterned using standard process techniques to provide a resist layer with a selectivity up to twenty. This would allow the fabrication of nozzles with smaller apertures, as less of the resultant aperture would initially be occupied with resist during the chamber-forming etch process.

Figure 2:
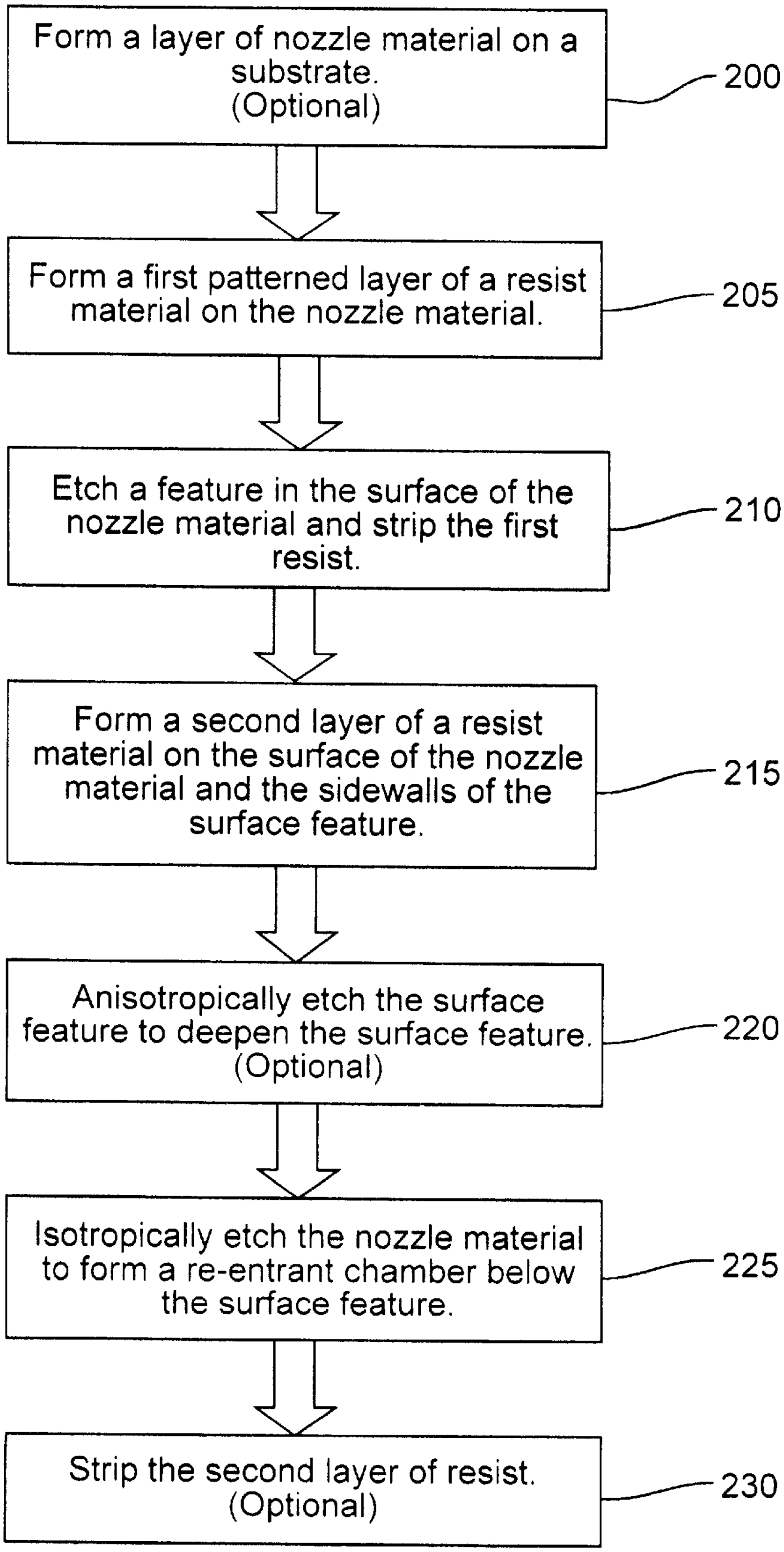
FIG. 2 is a flow chart representing a simplified process sequence consistent with the cross sections shown in FIGS. 1A–1J.

FIG. 2 is a general flow chart illustrating the process described in conjunction with FIGS. 1A–1J. The flowchart denotes a number of steps as optional. For example, a step 200 of forming a layer of nozzle material on a substrate is indicated as optional since the technique for forming such a chamber (and nozzle) structure is applicable whether or not there is a different material overlying a substrate. Thus there may be no need to form a separate layer. The result of this step was described above in connection with FIG. 1A. A step 205 of forming a first patterned layer of a resist material was described above in connection with FIG. 1B, and a step 210 of anisotropically etching a feature and stripping the resist was described in connection with FIG. 1C.

A step 215 of forming a second layer of resist material on the surface of the nozzle material and on the sidewalls of the surface feature was described above in connection with FIGS. 1D and 1E, and an optional step 220 of anisotropically etching the nozzle material to deepen the surface feature was described above in connection with FIG. 1F.

A step 225 of isotropically etching the nozzle material to form a re-entrant chamber below the surface feature was described above in connection with FIGS. 1F–1H while an optional step 230 of removing the second layer of resist material was described above in connection with FIG. 1J.

Figure 3:
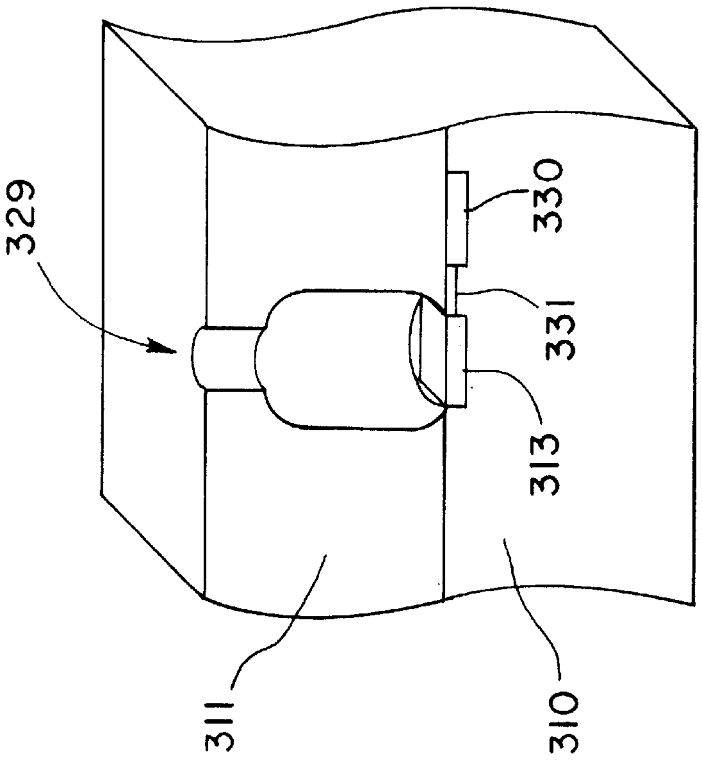
FIG. 3 is a simplified sectioned isometric view of an ink-jet nozzle and associated circuitry according to an embodiment of the present invention.

FIG. 3 shows a sectioned isometric view of a nozzle 329 in a layer of nozzle material 311 on a substrate 310. Prior to depositing the layer of nozzle material, an ink driver 313, integrated circuit 330, and conductive traces 331 were fabricated on the substrate. The conductive traces electrically couple the ink driver, or several ink drivers, to the integrated circuit. The integrated circuit may be an ink driver control circuit that receives a signal from a printer controller, for example, and actuates the appropriate ink driver to expel ink from that nozzle.

Incorporating driver control circuitry on the same chip as the nozzles reduces the number of interconnect lines from the printer controller to the print head. For example, a print head with 50 nozzles that are driven directly by a printer controller might have 54 interconnections between the printer controller and the print head. A print head with 104 nozzles might require 112 interconnections for directly driving each nozzle. However, a print head with up to 308 nozzles required only 36 interconnections when an ink driver control circuit is integrated on the chip with the nozzles. The bonding pads required for the interconnections consume chip area. Therefore, reducing the number of interconnections reduces chip size and increases the yield of print head chips per wafer.

Figure 4:
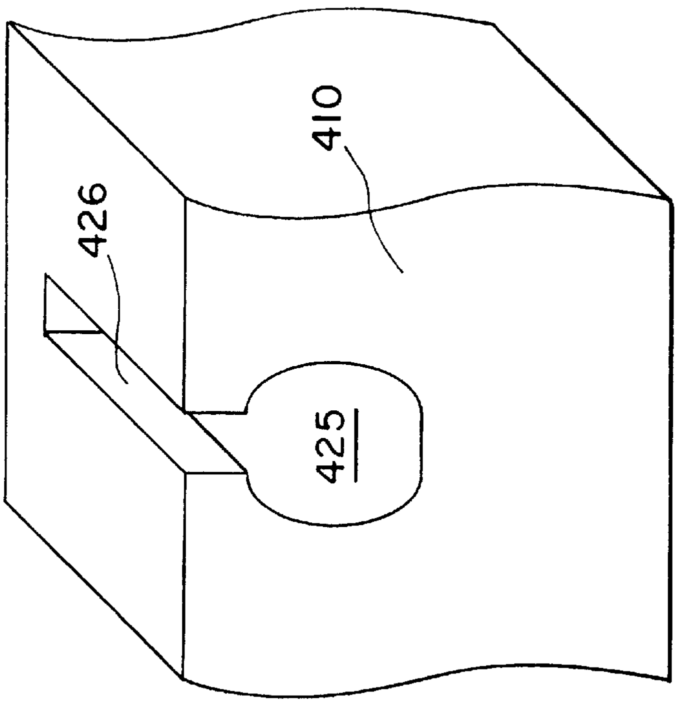
FIG. 4 is a simplified sectioned isometric view of a conduit formed in a substrate according to another embodiment of the present invention.

FIG. 4 shows another embodiment of the present invention where a chamber 425 is etched in a substrate 410. After forming the surface feature and protecting the sidewalls of the surface feature with resist, an isotropic etch is used to define the chamber. As above, the chamber is re-entrant to the aperture sidewall 426. In this instance the aperture is a trench. The substrate could be a silicon wafer, for example, in which case hydrogen bromide is a suitable precursor for an RPS-generated plasma to perform the isotropic etch.

While the above is a complete description of specific embodiments of the present invention, various modifications, variations, and alternatives may be employed. For example, the nozzle material may be spin-on-glass (SOG), sputtered alumina, polymer, metal, intermetallic, semiconductor, or other material, as is appropriate for the intended use. Intended uses could include dispensing fluids other than ink, such as chemical precursors, polymers, or biological solutions. Furthermore, the surface feature does not have to be formed using photolithography, but could be formed by other methods, such as laser cutting or machining. The dimensions provided are examples, and chambers and nozzles with smaller or larger dimensions could be fabricated according to the present invention. Other variations will be apparent to persons of skill in the art. These equivalents and alternatives are intended to be included within the scope of the present invention. Therefore, the scope of this invention should not be limited to the embodiments described, and should instead be defined by the following claims.

What is claimed is:

1. A method of etching a substrate with a top surface, a portion of the top surface defining a feature with a sidewall and a bottom, the method comprising:

forming an etch stop in the substrate;

forming a layer of resist over the sidewall of the feature wherein a portion of the resist disposed on the sidewall portion of the feature has a front surface and a back surface, the back surface of the portion of the resist being oriented toward the sidewall of the surface feature, but not over at least a portion of the bottom of the feature; and isotropically etching the substrate with a plasma to expose at least a portion of the back surface of the resist, wherein the etch stop limits the etching depth thereby forming a generally planar surface at the juncture of the bottom of the feature and the etch stop.

2. A method of etching a substrate with a top surface, a portion of the top surface defining a feature with a sidewall and a bottom, the method comprising:

forming a layer of resist over the sidewall of the feature wherein a portion of the resist disposed on the sidewall portion of the feature has a front surface and a back surface, the back surface of the portion of the resist being oriented toward the sidewall of the surface feature, but not over at least a portion of the bottom of the feature; and isotropically etching the substrate with a plasma to expose at least a portion of the back surface of the resist, wherein the layer of resist comprises photoresist.

3. The method of claim 1 wherein isotropically etching the substrate includes etching back toward the top surface of the substrate.

4. A method of forming a chamber in a material having an upper surface, the method comprising:

forming an etch stop in the substrate;

forming a resist layer on the upper surface, the material having a cavity extending below the upper surface, the cavity having a width, a bottom surface, and a sidewall;

patterning the resist layer to cover at least a first portion of the upper surface and at least a second portion of the sidewall, but leaving at least a third portion of the bottom surface exposed, wherein a portion of the resist disposed on the sidewall has a front surface and a back surface; and isotropically etching the material to form a chamber below the cavity, thereby exposing at least a portion of the back surface of the resist, the chamber having a chamber width greater than the cavity width, wherein a chamber wall forms a re-entrant angle with the sidewall, wherein the etch stop limits the etching depth thereby forming a generally planar surface at the juncture of the bottom of the feature and the etch stop.

5. A method of forming a chamber in a material having an upper surface, the method comprising:

forming a resist layer on the upper surface, the material having a cavity extending below the upper surface, the cavity having a width, a bottom surface, and a sidewall;

patterning the resist layer to cover at least a first portion of the upper surface and at least a second portion of the sidewall, but leaving at least a third portion of the bottom surface exposed; and isotropically etching the material to form a chamber below the cavity, the chamber having a chamber width greater than the cavity width, wherein a chamber wall forms a re-entrant angle with the sidewall, wherein the cavity is a pit.

6. The method of claim 4 wherein the cavity is a trench.

7. The method of claim 4 wherein the material comprises a semiconductor.

8. A method of forming a chamber in a material having an upper surface, the method comprising:

forming a resist layer on the upper surface, the material having a cavity extending below the upper surface, the cavity having a width, a bottom surface, and a sidewall;

patterning the resist layer to cover at least a first portion of the upper surface and at least a second portion of the sidewall, but leaving at least a third portion of the bottom surface exposed; and isotropically etching the material to form a chamber below the cavity, the chamber having a chamber width greater than the cavity width, wherein a chamber wall forms a re-entrant angle with the sidewall, wherein the material comprises an oxide.

9. The method of claim 8 wherein the oxide comprises silicon glass.

10. A method of forming a chamber in a material having an upper surface, the method comprising:

forming a resist layer on the upper surface, the material having a cavity extending below the upper surface, the cavity having a width, a bottom surface, and a sidewall;

patterning the resist layer to cover at least a first portion of the upper surface and at least a second portion of the sidewall, but leaving at least a third portion of the bottom surface exposed; and isotropically etching the material to form a chamber below the cavity, the chamber having a chamber width greater than the cavity width, wherein a chamber wall forms a re-entrant angle with the sidewall, wherein the material comprises silicon nitride.

11. The method of claim 4 further comprising anisotropically etching the bottom surface to deepen the cavity after patterning the resist layer and before isotropically etching the material.

12. The method of claim 4 wherein the material comprises a plurality of layers.

13. The method of claim 4 wherein the chamber wall forms an angle greater than 90 degrees with a back wall of the chamber.

14. A method of forming a nozzle structure, the method comprising:

forming a layer on a substrate, the layer having a surface;

forming an etch stop between the layer and the substrate;

forming a surface feature in the surface of the layer, the surface feature having a sidewall and a bottom surface;

covering at least a first portion of the sidewall of the surface feature and at least a second portion of the surface of the layer with a resist layer, leaving at least a third portion of the bottom surface of the surface feature exposed; and isotropically etching the layer to form a chamber below the surface feature wherein the etch stop prevents etching into the substrate and wherein a chamber wall forms a re-entrant angle with the sidewall of the surface feature.

15. The method of claim 14 further comprising anisotropically etching the bottom surface to deepen the surface feature after said covering and before said isotropically etching.

16. A method of forming a nozzle structure, the method comprising:

forming a layer on a substrate, the layer having a surface;

forming a surface feature in the surface of the layer, the surface feature having a sidewall and a bottom surface;

covering at least a first portion of the sidewall of the surface feature and at least a second portion of the surface of the layer with a resist layer, leaving at least a third portion of the bottom surface of the surface feature exposed; and isotropically etching the layer to form a chamber below the surface feature wherein a chamber wall forms a re-entrant angle with the sidewall of the surface feature, wherein the layer comprises a ceramic.

17. The method of claim 16 wherein the substrate includes silicon glass.

18. The method of claim 14 wherein the substrate is a silicon wafer.

19. The method of claim 18 wherein the silicon wafer includes an ink driver structure coupled to the chamber.

20. The method of claim 19 wherein the silicon wafer further includes integrated drive circuitry.

21. A method of forming a nozzle structure, the method comprising:

forming a layer on a substrate, the layer having a surface;

forming a surface feature in the surface of the layer, the surface feature having a sidewall and a bottom surface;

covering at least a first portion of the sidewall surface feature and at least a second portion of the surface of the layer with a resist layer, leaving at least a third portion of the bottom surface of the surface feature exposed; and isotropically etching the layer to form a chamber below the surface feature wherein a chamber wall forms a re-entrant angle with the sidewall of the surface feature, wherein the layer is formed by a chemical vapor deposition process.

22. A method of forming a nozzle structure, the method comprising:

forming a layer on a substrate, the layer having a surface;

forming a surface feature on the surface of the layer, the surface feature having a sidewall and a bottom surface;

covering at least a first portion of the sidewall of the surface feature and at least a second portion of the surface of the layer with a resist layer, leaving at least a third portion of the bottom surface of the surface feature exposed; and isotropically etching the layer to form a chamber below the surface feature wherein a chamber wall forms a re-entrant angle with the sidewall of the surface feature, wherein the layer is formed by a spin on-glass process.

23. A method of forming a nozzle structure, the method comprising:

forming a layer on a substrate, the layer having a surface;

forming a surface feature in the surface of the layer, the surface feature having a sidewall and a bottom surface;

covering at least a first portion of the sidewall of the surface feature and at least a second portion of the surface of the layer with a resist layer, leaving at least a third portion of the bottom surface of the surface feature exposed; and isotropically etching the layer to form a chamber below the surface feature wherein a chamber wall forms a re-entrant angle with the sidewall of the surface feature, wherein the layer is formed by a physical vapor deposition process.

24. The method of claim 14 wherein the surface feature has a cross section with a minimum dimension between about 1–50 microns.

25. The method of claim 14 wherein an angle formed by the chamber wall and a back wall of the chamber is greater than 90 degrees.

26. The method of claim 1 wherein the etch stop comprises titanium.

27. The method of claim 1 wherein the etching step forms a chamber below the feature, the chamber having a width greater than the feature width.

28. The method of claim 27 wherein the chamber wall and the planar surface form an oblique shaped bowl.

29. The method of claim 1 further comprising removing the exposed etch stop and the resist.

30. The method of claim 29 further comprising sputter etching an upper portion of the sidewall of the feature to form a countersunk facet.

31. The method of claim 14 wherein the etch stop comprises titanium.

32. The method of claim 14 wherein the layer etches at a quicker rate than the etch stop thereby resulting in a generally planar backwall of the chamber.

33. The method of claim 32 wherein the juncture of the chamber wall and the planar backwall forms an oblique bowl shape.

* * * * *